Figure 1:
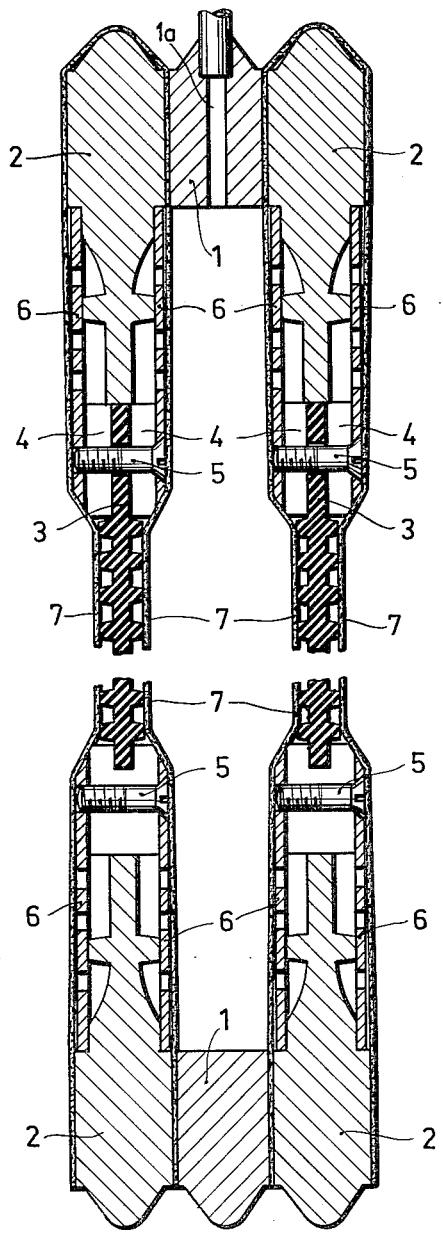

Dec. 7, 1965 K. V. LENNSTRÖM 3,221,883
FILTER PRESS
Filed May 18, 1962 2 Sheets-Sheet 2

INVENTOR
Karl Valdemar Lennström

BY Pierce, Schiffler & Parker
ATTORNEYS

United States Patent Office 3,221,883
Patented Dec. 7, 1965

3,221,883
FILTER PRESS
Karl Valdemar Lennström, Oskarshamn, Sweden, assignor to Reymersholms Gamla Industri Aktiebolag, Halsingborg, Sweden
Filed May 18, 1962, Ser. No. 202,638
3 Claims. (Cl. 210—228)

The invention relates to filter presses and more particularly to frame filter presses, which comprise a plurality of juxtaposed alternating suspension supply frames, into which suspension to be filtered is introduced, and filter boards, including filtering elements, from which the filtered clean liquid is withdrawn. A filtering element comprises a filter cloth, which is usually stretched round the filter board frame and jammed between the circumferential portions of the filter board frame and the adjacent suspension supply frames, and is supported by foraminous plates or grids, which form side walls of the filter board and leave a drainage space between them. Due to the fact that the suspensions to be filtered often cause clogging of the inlet channels of the suspension supply frames great differential pressures may arise in the press between the spaces of the clear suspension supply frames having full working pressure of, for instance, 3–4 kgs./cm.$^2$ superatmospheric pressure and the clogged suspension supply frame having practically atmospheric pressure. This often causes breakage of the filter boards adjacent to the clogged suspension supply frame. It has been suggested in the art, it is true, to eliminate this drawback by replacing the filter board structure described above by a mat of wire-netting secured in a rectangular filter board frame or by a rifled rubber plate reinforced with a grate-like structure, but none of these structures is fully satisfactory. A wire netting is expensive and difficult to fit properly in a filter board frame. A reinforced rubber board is also expensive and the reinforcing structure can easily be damaged by the differential pressure in case of clogging.

It is one object of the invention to provide a filter board structure which can withstand differential pressures due to clogging of inlet passages of a suspension supply frame. It is another object to make feasible to use filter boards of exceptionally low thickness. It is also an object to obtain a filter press with high capacity per unit of length of the press (perpendicularly to the filter boards. A further object is to provide means for facilitating the removal of the filter cake when emptying the press at the end of the filtering procedure. Further objects will be obvious as the description proceeds.

In order to obtain these objects and further advantages the filter board comprises a filter board frame and a mat suspended therein from the top portion thereof so as to permit, when the filter board is swung about an axis along said top portion, an essential portion of the mat to become displaced out of the space defined by said filter board frame. At the end of a filtering operation the filter boards and suspension supply frames may be spread apart along their supporting structure and the filter frames may then be swung to loosen the filter cake therefrom e.g. manually. The mat is preferably made of rubber, plastics or similar flexible material and has a drainage pattern, such as studs or grooves, on its flat surfaces. The mat may, however, be built up from hanging chains which may be interconnected, or, possibly, a wire-netting, but the objects of the invention are believed to be best attained by a mat of rubber or plastic.

In the assembly of suspension supply frames and filter boards in the filter press, filter cloths are applied at both sides of each filter board, and the mat is the only element to separate the cloths of a filter board. Therefore the thickness of the filter board, or rather the effective thickness thereof, needs theoretically not be greater than the thickness required for the mat, and usually about 10 mm. will be sufficient, even if consideration is taken to the fact that a given minimum thickness of the filter board itself is required for the outlet passage for clear filtrate. Since the sludge space in the press, i.e. the free volume of the suspension supply frames and the volume represented approximately by the difference, if any, between filter board thickness and mat thickness, is the effective volume of a filter press it will be understood that much space is gained by using thin filter boards or mats. This is so particularly in case of relatively thin suspension supply frames which have to be used in treating difficultly filterable suspensions.

Thanks to the suspended status of the mat the removal of filter cake that may adhere to the filter cloth is facilitated, when after spacing the filter boards and suspension supply frames from one another the filter boards are swung more or less so that the mat strikes the inside of the cloth whereby the cake becomes loosened.

For a better understanding of the invention reference will now be made to embodiments thereof illustrated in the drawing as an example only.

Figure 2:
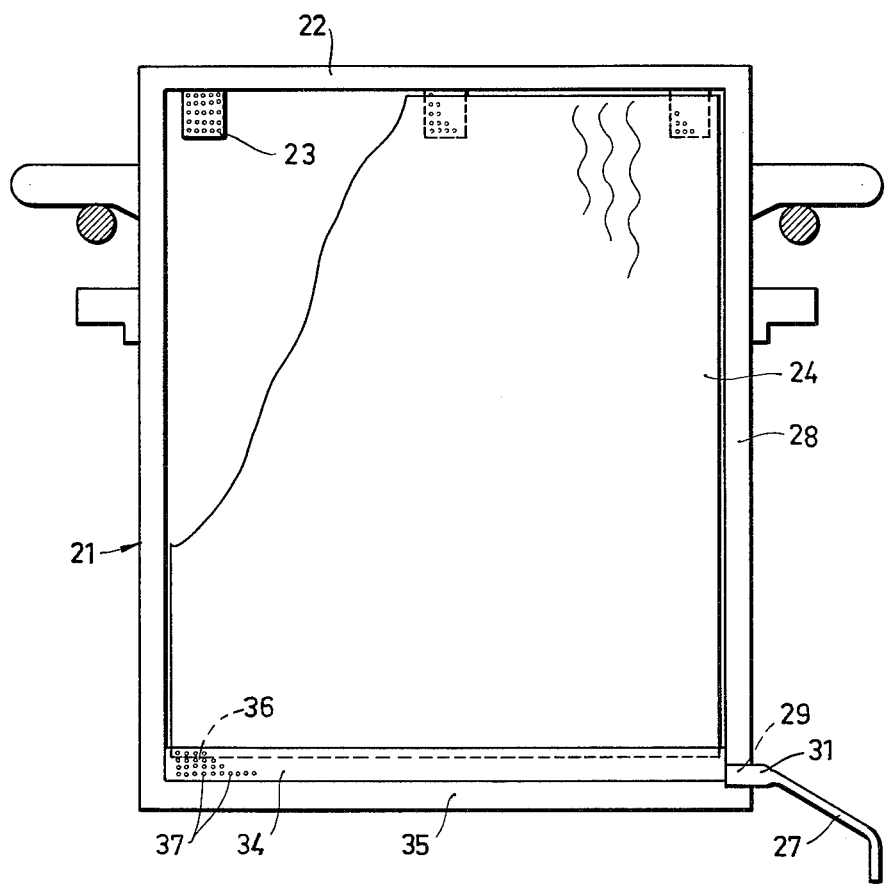

In the drawings:

FIG. 1 is a cross-sectional view of a portion of one embodiment of a filter press according to the invention and FIG. 2 is a side view of a filter board of an alternative embodiment of the invention.

In FIG. 1 of the drawings it is shown a portion only of a filter press according to the invention, namely a suspension supply frame 1 having an inlet duct 1a to the space between two adjacent filter boards 2. On either side of each filter board a plate 6 is secured to the top bar of its frame. Flat lists 4 are secured to these plates and arranged to squeeze the upper border portion of a rubber mat 3 between them. The lists 4 are tightened about the mat with screws 5. The rubber mat is provided with projections and depressions to enable the filtered liquid to drain off. At the bottom portion of the filter board there is a conventional outlet, not illustrated. Each filter board frame is covered at both sides with a filter cloth 7 which in known manner is double folded and hung over the upper bar of the filter board frame. In the illustrated embodiment the mat hangs down freely.

If it is desired to fasten the mat at the sides or at the bottom the fastening means must be extendible or otherwise permit the mat to bulge out when the filter board is placed at a sufficiently great angle to the vertical position.

As is illustrated in FIG. 2 the filter board may consist of a filter board frame 21 to the top bar 22 of which there are secured, as by welding, three fins 23. The mat 24 is mounted on the fins and is freely suspended therefrom. An outlet pipe 27 is attached to the lowermost portion of one of the side bars 28 of the filter board frame and cooperates with an opening 29 in the bar. This opening and the attaching portion 31 of the pipe 27 are higher the thickness of the filter than broad in order to provide a sufficiently large cross sectional area for accommodating the effluent notwithstanding the exceptionally small thickness of the filter board frame, which may be, e.g. 10 millimeters. A pair of perforated walls 34 are fixed on top of the bottom bar 35 of the filter board frame to form a flute 36 in which the filtrate accumulates, when it flows down along the mat 24, before it is discharged through pipe 27. The perforations 37 permit liquid to enter into flute 36 and the suspension solids to form a cake on the filter cloth. The flute 36 serves the object of preventing the cloth from covering and obstructing the outlet whether located in the side bars 28 or bottom bar 35. The mat 24 may very well extend into the upper portion of the flute 36 but not so far as to obstruct the discharge.

The outlet may, if desired, be arranged through the bottom bar 35.

One advantage of the exceptionally thin filter boards of the present invention is the possibility to economically use relatively precious material for the filter board. This is particularly the case when filter boards and suspension supply frames are made of profilated bars.

The invention is not limited to the particular embodiments described but can be modified. Thus the rubber or plastic mat may be double and, if desired, means may be provided for introducing pressurized air through a channel in the filter board frame into the interspace between the mat parts for causing them to bulge out. Alternatively the mat may be inflatable, for the same reason. In another embodiment the filter board has discharge openings in the bottom bar for the effluent liquid.

What is claimed is:

1. A filter press comprising an assembly of alternating juxtaposed suspension supply frames and filter boards, inlet means for introducing suspension to be filtered into said suspension supply frames and outlets for discharging liquid from the interiors of said filter boards, each of said filter boards comprising a rectangular filter frame having top and bottom and side bars, a filter cloth secured to each side surface of each filter frame and a flexible mat freely suspended from said top bar between said filter cloths and being freely movable transversely of said filter board relative to said side and bottom bars.

2. A filter press as defined in claim 1 in which said mat is a sheet of elastic material the side surfaces of which have alternately projecting and depressed portions.

3. A filter press as defined in claim 1 in which each filter board has a drainage flute along the upper surface of said bottom bar of said filter frame, said drainage flute communicating with said outlet.

References Cited by the Examiner

UNITED STATES PATENTS

| | | | |
|---|---|---|---|
| 884,253 | 4/1908 | Youngman | 210—224 |
| 900,185 | 10/1908 | Merrill | 210—224 |
| 947,856 | 2/1910 | Sellenscheidt | 210—231 |
| 1,091,080 | 3/1914 | Porges | 210—231 |
| 2,006,131 | 6/1935 | Durant | 210—227 X |
| 2,024,955 | 12/1935 | Teatini | 210—224 |
| 2,590,242 | 3/1952 | Fusco | 210—228 |
| 2,932,399 | 4/1960 | Emele | 210—225 |
| 3,002,626 | 10/1961 | Vogt | 210—231 X |

FOREIGN PATENTS

| | | |
|---|---|---|
| 746,615 | 3/1933 | France. |

REUBEN FRIEDMAN, *Primary Examiner.*

ROBERT F. BURNETT, *Examiner.*